United States Patent [19]
Nishi

[11] Patent Number: 6,049,591
[45] Date of Patent: Apr. 11, 2000

[54] GRIEVANCE CALL PROCESSING SYSTEM

[75] Inventor: Hidetaka Nishi, Fukuoka, Japan

[73] Assignee: Fujitsu Limited, Kanagawa, Japan

[21] Appl. No.: 09/076,026

[22] Filed: May 11, 1998

[30]     Foreign Application Priority Data

Jan. 19, 1998   [JP]   Japan ................................. 10-007773

[51] Int. Cl.⁷ ............................. H04M 1/24; H04M 3/08; H04M 3/22

[52] U.S. Cl. .................................. 379/12; 379/1; 379/18; 379/29

[58] Field of Search ............................... 379/1, 9–10, 12, 379/15, 16, 18, 20, 23, 27, 29, 34, 265, 309

[56]                References Cited

U.S. PATENT DOCUMENTS

| | | | |
|---|---|---|---|
| 4,464,543 | 8/1984 | Kline et al. ................................ | 379/29 |
| 4,972,453 | 11/1990 | Daniel, III et al. ....................... | 379/10 |
| 5,596,623 | 1/1997 | Uchiba et al. . | |
| 5,659,604 | 8/1997 | Beckmann ............................... | 379/220 |
| 5,666,397 | 9/1997 | Lamons et al. ........................... | 379/34 |
| 5,857,011 | 1/1999 | Kennedy et al. .......................... | 379/32 |
| 5,862,211 | 1/1999 | Roush ..................................... | 379/309 |

*Primary Examiner*—Curtis A. Kuntz
*Assistant Examiner*—Binh K. Tieu
*Attorney, Agent, or Firm*—Helfgott & Karas, P.C.

[57]                ABSTRACT

A grievance call processing system capable of automatically shifting a grievance call reception state to a test state. An electronic switchboard notifies the telephone number information of a subscriber to a workstation, which stores and displays the telephone number information. When a maintenance person makes a test activation from the workstation upon reception of a grievance call the telephone number information is simultaneously and automatically notified to a testing trunk, which provides the telephone number information to the electronic switchboard, which then sets up a testing path from the workstation to a subscriber testing equipment through the testing trunk for the preparation of a subscriber test state.

11 Claims, 14 Drawing Sheets

RECEPTION FIGURE COUNTER

T.N. STORAGE AREA

| [0] |
|-----|
| [1] |
| [2] |
| . |
| . |
| . |
| [18] |
| [19] |

GRIEVANCE CALL PROCESSING SYSTEM

BACKGROUND OF THE INVENTION

1. Field of the Invention

The present invention relates to a grievance call processing system, and in particular to a grievance call processing system used for a customer service reception process in an electronic switchboard.

There has been demanded, not only domestically but also internationally, a system for processing a grievance call for immediately removing a fault in a telephone or a switchboard which lies between subscribers who encounter a call fault.

2. Description of the Related Art

Such a grievance call processing system which has been known as one example of a customer service reception processing system in an electronic switchboard is shown in FIGS. 14–22 referring to the operations. The operations for processing a grievance call from a subscriber will be described hereinafter with reference numerals attached to the figures.

In operation of FIG. 14, a subscriber hooks off a telephone TE1 to make a predetermined grievance call (1). For this grievance call a special telephone number, which will be hereinafter abbreviated as T.N. for convenience's sake, such as "116" is transmitted together with the T.N. of the subscriber as a dial notification.

This dial notification thus transmitted from the subscriber telephone TE1 is transferred to a switch unit SW in an electronic switchboard through a subscriber circuit SLC. The switch unit SW further transfers the dial notification from the subscriber telephone TE1 as a dial notification (2) to a central processing unit CC forming the electronic switchboard together with the switch unit SW. At this time, the dial notification (2) includes the special grievance call and a subscriber's T.N. as above-mentioned.

In operation of FIG. 15, the central processing unit CC carries out an analysis (3) for the dial notification (2) as received, thereby recognizing which subscriber has made the grievance call.

In operation of FIG. 16, the central processing unit CC transmits an arrival notification (4) for informing that the grievance call has been received to a trunk CATI exclusively used for the reception of the grievance call. The trunk CATI further transfers the arrival notification (4) to a (telephone) line switch unit CBOX for maintenance as an arrival notification (5), which is then transferred from the line switch unit CBOX as an arrival notification (6) to a workstation TWS provided in combination with a telephone TE2 on the maintenance side.

The workstation TWS displays on a CRT screen that the arrival notification (6) has been received, which is informed with e.g. a buzzer to a maintenance person if necessary. It is to be noted that the workstation TWS is required to be continuously supplied with power.

In operation of FIG. 17, being informed according to the operation illustrated in FIG. 16 of the fact that the grievance call has been received from the workstation TWS, the maintenance person hooks off his own telephone TE2. Accordingly, the workstation TWS transmits an off-hook instruction (7) to the line switch unit CBOX, which then transfers the off-hook instruction (7) to the trunk CATI as an off-hook instruction (8). The trunk CATI further transfers the off-hook instruction (8) to the central processing unit CC as an off-hook notification (9).

In operation of FIG. 18, the central processing unit CC makes a path connection (10) in the switch unit SW between the subscriber circuit SLC connected to the subscriber and the trunk CATI connected to the maintenance person in response to the off-hook notification (9), whereby conversations between the subscriber and the maintenance person are made possible to carry out a grievance call reception (11) on the maintenance side. The maintenance person then inquires the subscriber's T.N.

In operation of FIG. 19, after the grievance call reception (11) is conducted on the maintenance side, the subscriber performs an on-hook operation (12) of the telephone TE1. In response to the on-hook operation (12), the subscriber circuit SLC transmits an on-hook signal (31), which is then transferred to the central processing unit CC, in which the switch unit SW is controlled to perform a path disconnection (32) between the subscriber-maintenance person.

Recognizing the path disconnection, the maintenance person performs an on-hook operation (13) of the telephone TE2.

In operation of FIG. 20, the maintenance person carries out a test for removing a fault which causes the grievance call on the subscriber side.

At first, on the workstation TWS the maintenance person enters a manual input (33) of the subscriber's T.N. which is received or told from the subscriber in the operation of FIG. 18.

Followed by the T.N. input (33), the workstation TWS transmits a demand for a test (trial) activation (18) including the subscriber's T.N. to a testing trunk TT, which then transfers the subscriber's T.N. to a PB (pushbutton) receiver PRU with a PB signal (19). The PB receiver PRU analyzes the subscriber's T.N. from the testing trunk TT by using the PB signal. The subscriber's T.N. is given to the central processing unit CC in the form of a T.N notification (20).

In operation of FIG. 21, the central processing unit CC performs an analysis (22) for the subscriber data based on the subscriber's T.N. received from the testing trunk TT via the PB receiver PRU to specify the accommodation position of the subscriber.

Hence, the central processing unit CC leads the subscriber circuit SLC for the subscriber to be tested in a subscriber testing equipment LTE, and makes a path connection (23) between the subscriber testing equipment LTE—the testing trunk TT.

In operation of FIG. 22, after the completion of the path connection (23), the central processing unit CC transmits a path connection completion notification (24) to the workstation TWS via the testing trunk TT. When the path connection completion notification (24) is provided for the workstation TWS, the maintenance person manually inputs a power supply demand/ringing transmission demand (34) on the workstation TWS.

This demand (34) passes through the switch unit SW via the testing trunk TT, and is notified as a power supply demand/ringing demand (35) to the subscriber testing equipment LTE. The subscriber testing equipment LTE provides the power supply demand/ringing demand for the subscriber through a selector SEL and the subscriber circuit SLC, so that a subscriber call (36) is provided from the telephone TE1.

Then, an off-hook operation is performed by the subscriber and an off-hook operation (37) is also performed by the maintenance person, whereby a testing conversation between the subscriber and the maintenance person is made possible through the testing trunk TT and the line switch unit CBOX, enabling a test condition to be prepared.

In such prior art grievance call processing system, up to the test condition shifting from the reception of the grievance call, the maintenance person should inquire the subscriber's T.N. and take memos thereof for the reception of the grievance call in the state of FIG. 18, and manually input the subscriber's T.N. necessary for the test activation while looking at the memo after the subscriber and the maintenance person have hooked on their telephones as shown in FIG. 19.

Therefore, it is disadvantageous that the maintenance person needs cumbersome operations and may cause input errors.

It is also disadvantageous that due to such a manual operation, the maintenance person and the subscriber having made the grievance call should wait for several 10 seconds up to the test condition, resulting in a large amount of time loss.

SUMMARY OF THE INVENTION

It is accordingly an object of the present invention to provide a grievance call processing system which enables a process shifting from a grievance call reception to a test condition to be automatically realized.

For the achievement of the above-mentioned object, a grievance call processing system according to the present invention comprises an electronic switchboard for providing a grievance call made by a subscriber to a maintenance person, a testing trunk and a subscriber testing equipment each connected to the electronic switchboard, and a workstation provided for the maintenance person.

Additionally, in response to a subscriber's call, the electronic switchboard notifies a T.N. information of the subscriber which has been previously held therein to the workstation, the workstation storing and displaying the T.N. information of the subscriber, and when the maintenance person makes a test activation from the workstation after reception of the grievance call, the T.N. information being simultaneously and automatically notified to the testing trunk, which then provides the T.N. information to the electronic switchboard, which sets up a testing path connecting the workstation, the testing trunk, the subscriber testing equipment, and the subscriber for the preparation of a subscriber testing state.

Namely, in the present invention, taking advantage of the T.N. information of the subscriber having made the grievance call held in the electronic switchboard, the T.N. information is notified to the workstation. In the workstation, the T.N. information is displayed so that the T.N. information can be a basis for specifying the subscriber to be tested and for a test activation. This test activation forms an automatic testing path through the testing trunk, the electronic switchboard, and the subscriber testing equipment whereby the grievance call reception state can be shifted to the subscriber test condition.

The above electronic switchboard may be composed of a switch unit and a central processing unit for controlling the switch unit, and the central processing unit holds therein the T.N. information of the subscriber.

Also, the grievance call processing system may further comprise a trunk, exclusively used for receiving the grievance call, which connects the electronic switchboard and the maintenance person, and a line switch unit for maintenance.

When the testing trunk receives the T.N. information, a pushbutton receiver may analyze the T.N. information to notify the T.N. to the electronic switchboard.

The electronic switchboard may transmit the T.N. notification to the workstation upon detecting an off-hook operation by the subscriber.

Furthermore, when the testing path is set up, the workstation may transmit a power supply demand to the subscriber.

BRIEF DESCRIPTION OF THE DRAWINGS

Throughout the figures, the same reference numerals indicate identical or corresponding portions.

DESCRIPTION OF THE EMBODIMENTS

The operations of a grievance call processing system according to the present invention illustrated in FIGS. 1–9 will be sequentially described hereinafter referring to FIGS. 10–13.

Figure 1:
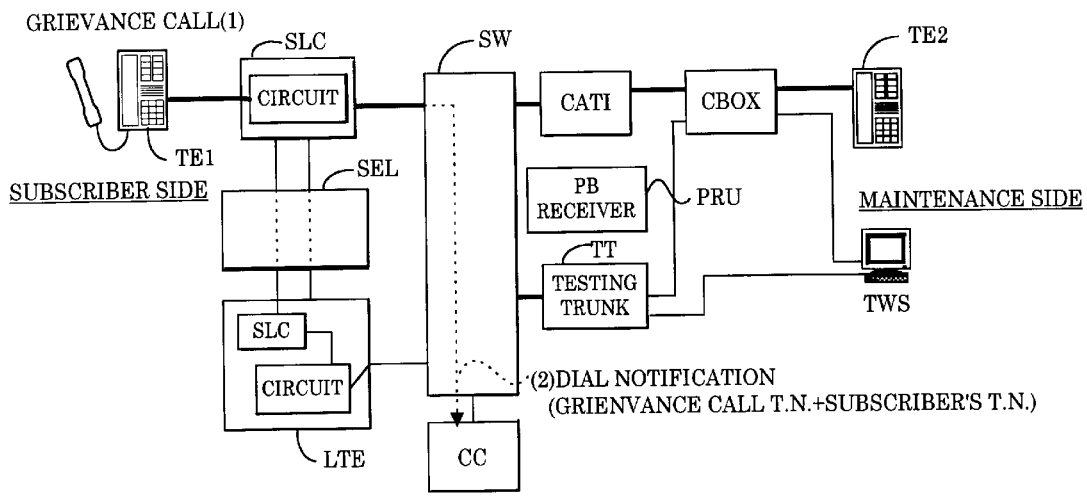
FIG. 1 is a block diagram illustrating an operation (1) of a grievance call processor system according to the present invention.
Figure 14:
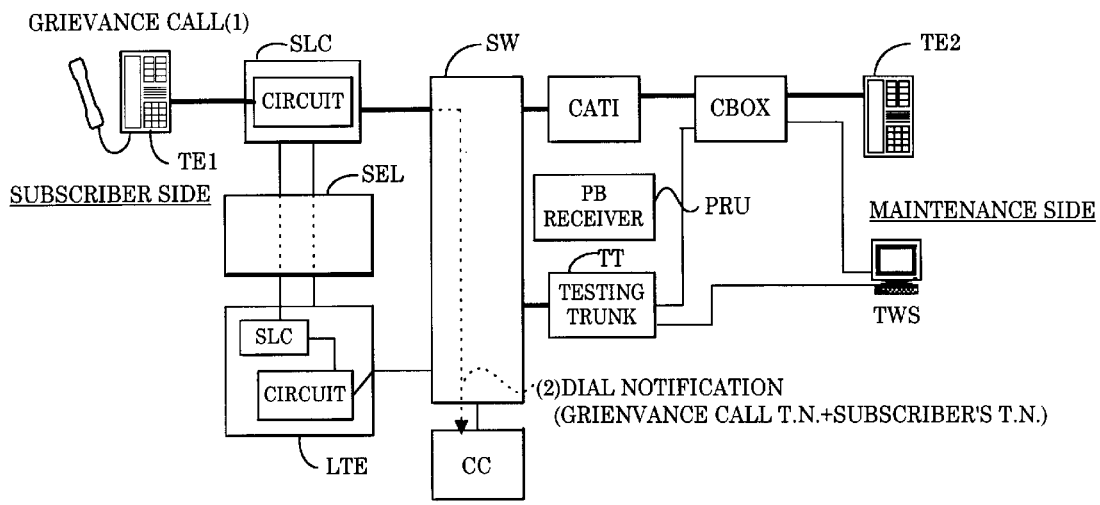
FIG. 14 is a block diagram illustrating an operation (1) of the prior art grievance call processing system.

In operation of FIG. 1, the above-mentioned operation in FIG. 14 is applied for the omission of the description.

Figure 2:
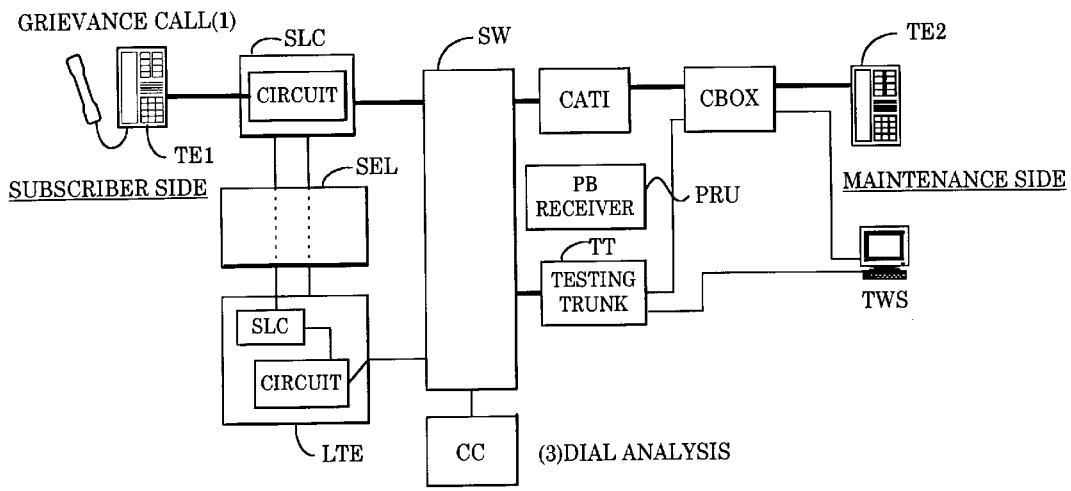
FIG. 2 is a block diagram illustrating an operation (2) of a grievance call processor system according to the present invention.
Figure 15:
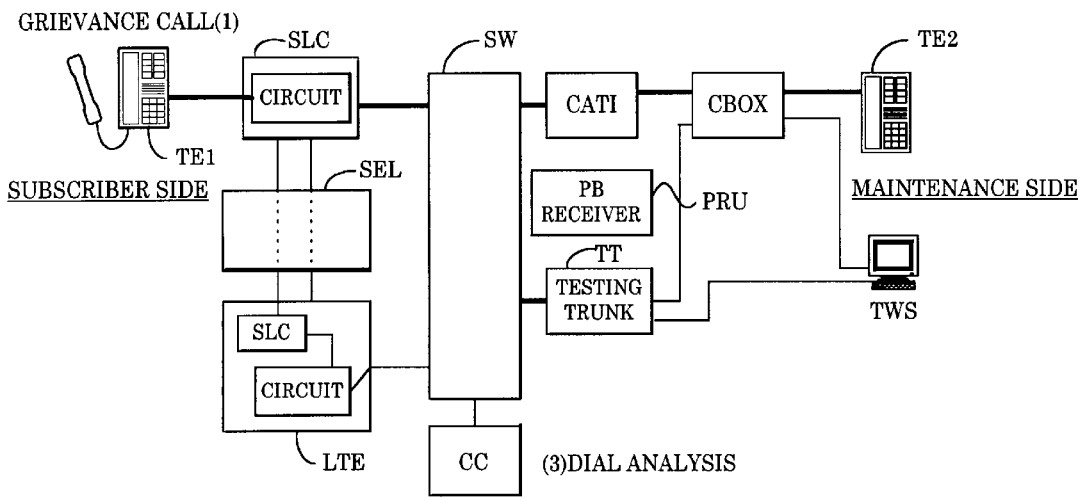
FIG. 15 is a block diagram illustrating an operation (2) of the prior art grievance call processing system.

In operation of FIG. 2, the above-mentioned operation in FIG. 15 is applied for the omission of the descriptions.

Figure 3:
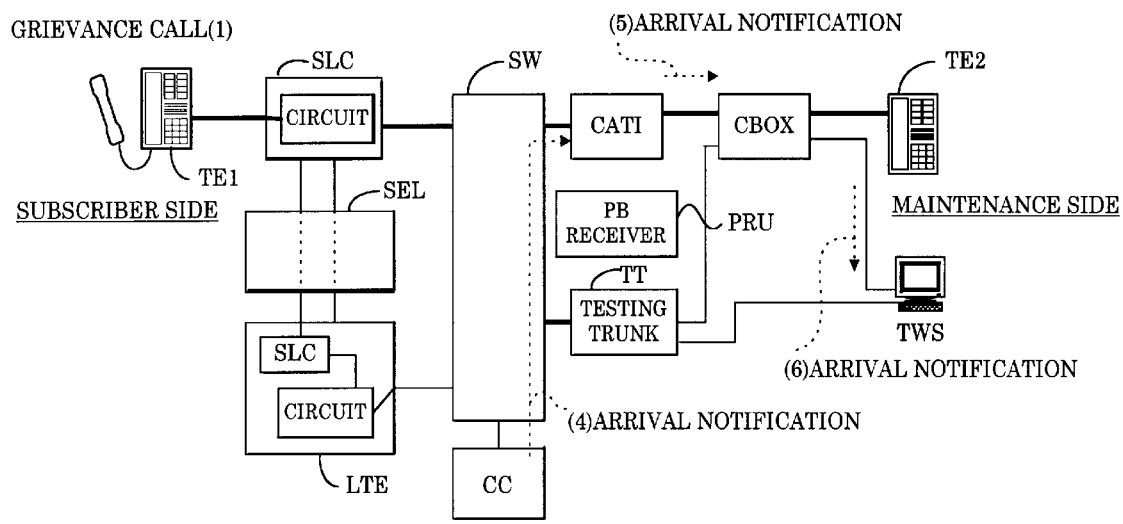
FIG. 3 is a block diagram illustrating an operation (3) of a grievance call processor system according to the present invention.
Figure 10:
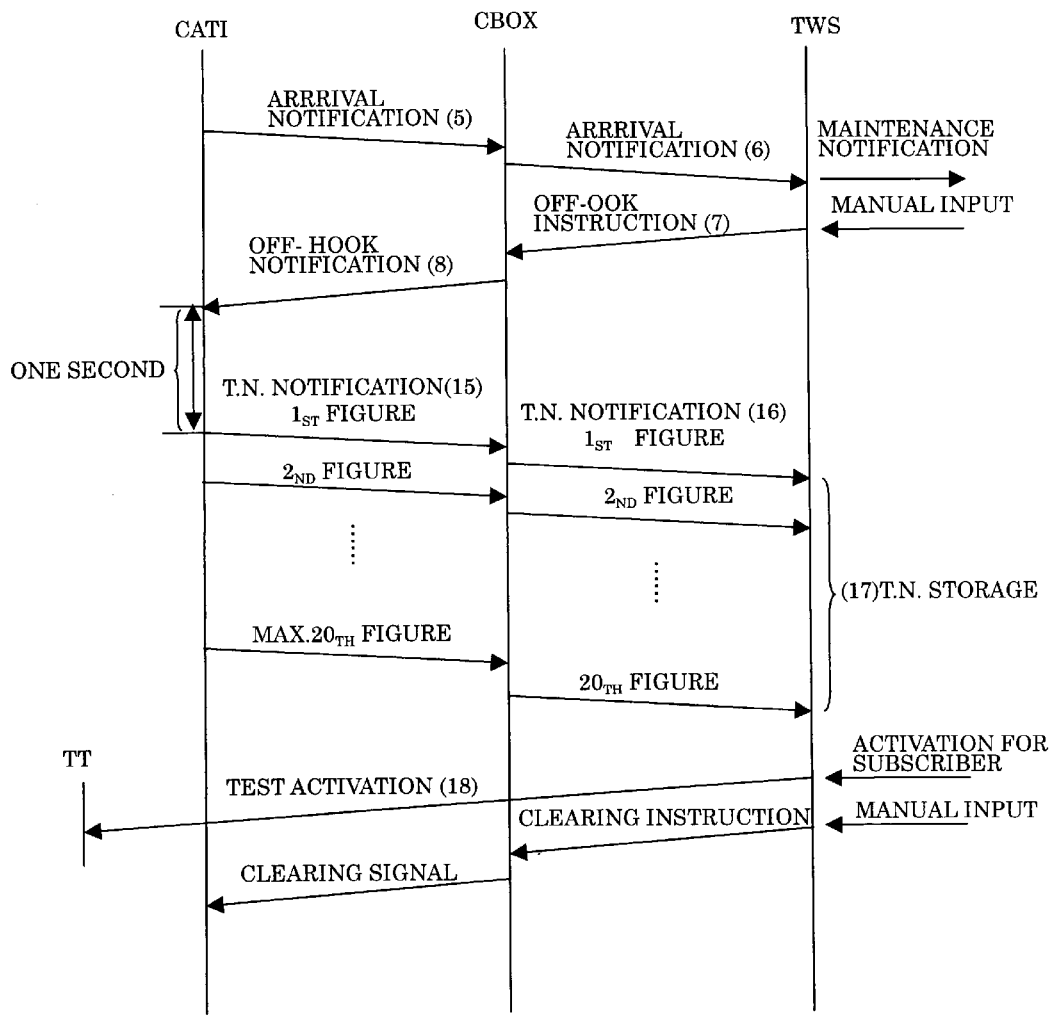
FIG. 10 is an operation sequence chart between a trunk CATI exclusively used for a grievance call reception and a workstation TWS in a grievance call processing system according to the present invention.
Figure 16:
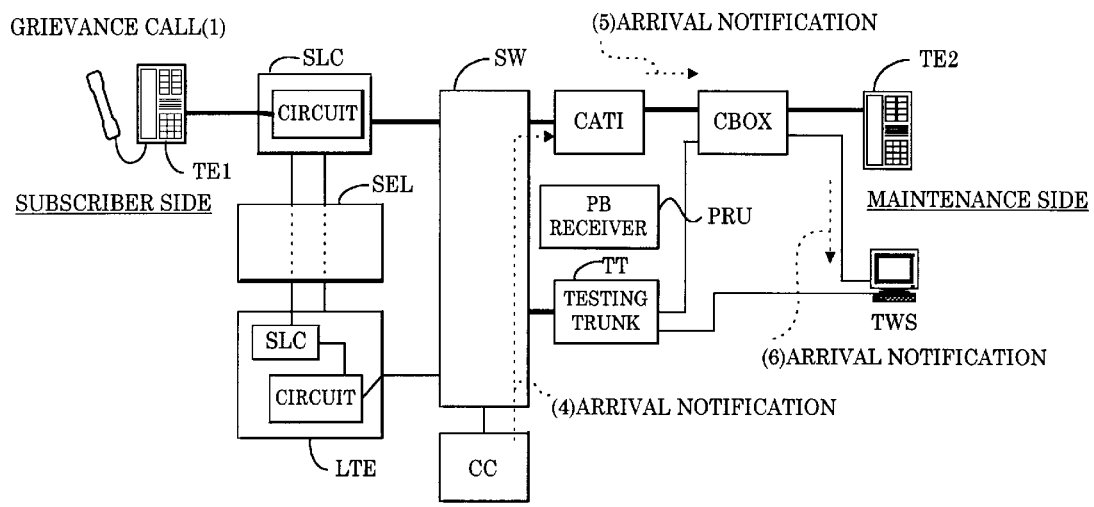
FIG. 16 is a block diagram illustrating an operation (3) of the prior art grievance call processing system.

In operation of FIG. 3, the above-mentioned operation in FIG. 16 is applied for the omission of the descriptions. It is to be noted that the arrival notifications (5), (6) are notified to the maintenance person as illustrated in FIG. 10.

Figure 4:
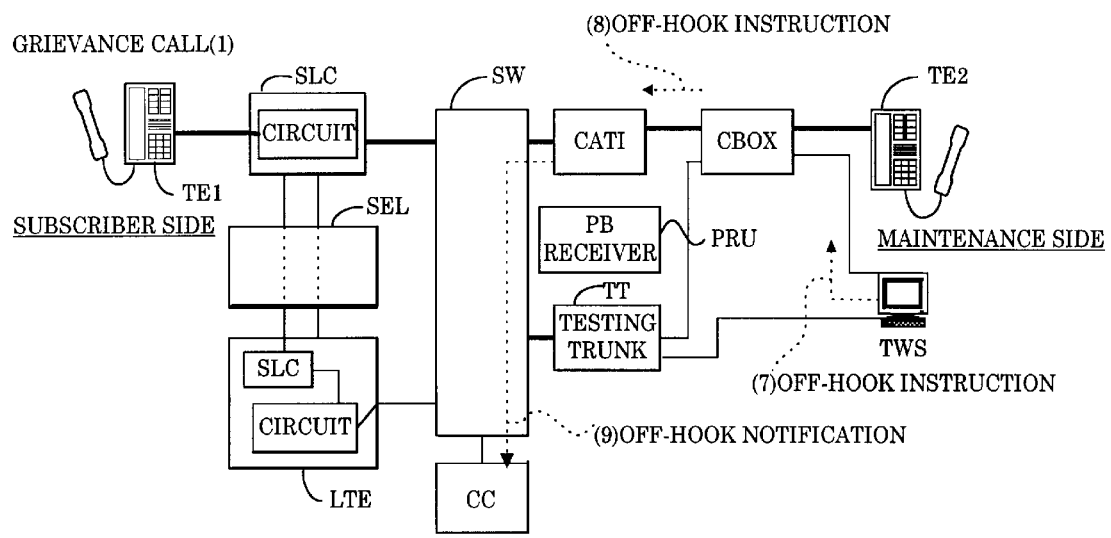
FIG. 4 is a block diagram illustrating an operation (4) of a grievance call processor system according to the present invention.
Figure 17:
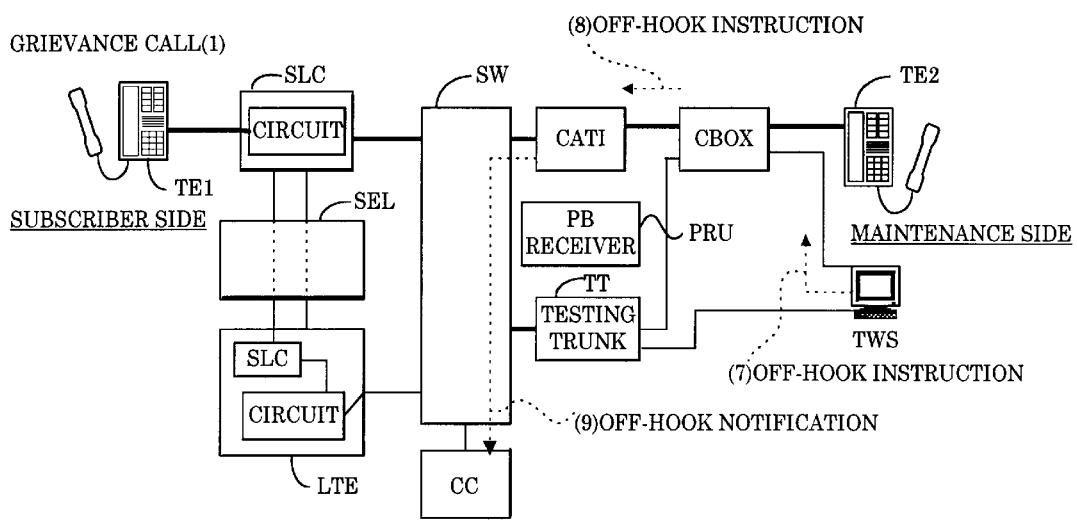
FIG. 17 is a block diagram illustrating an operation (4) of the prior art grievance call processing system.

In operation of FIG. 4, the above-mentioned operation in FIG. 17 is applied for the omission of the descriptions. It is to be noted that the off-hook instructions (7), (8) are illustrated in FIG. 10.

Figure 5:
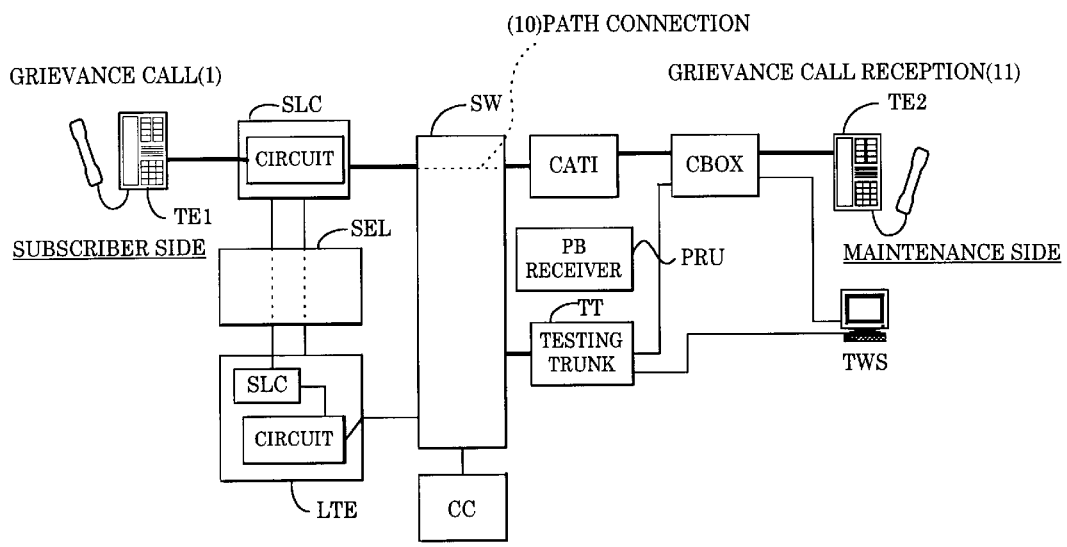
FIG. 5 is a block diagram illustrating an operation (5) of a grievance call processor system according to the present invention.
Figure 18:
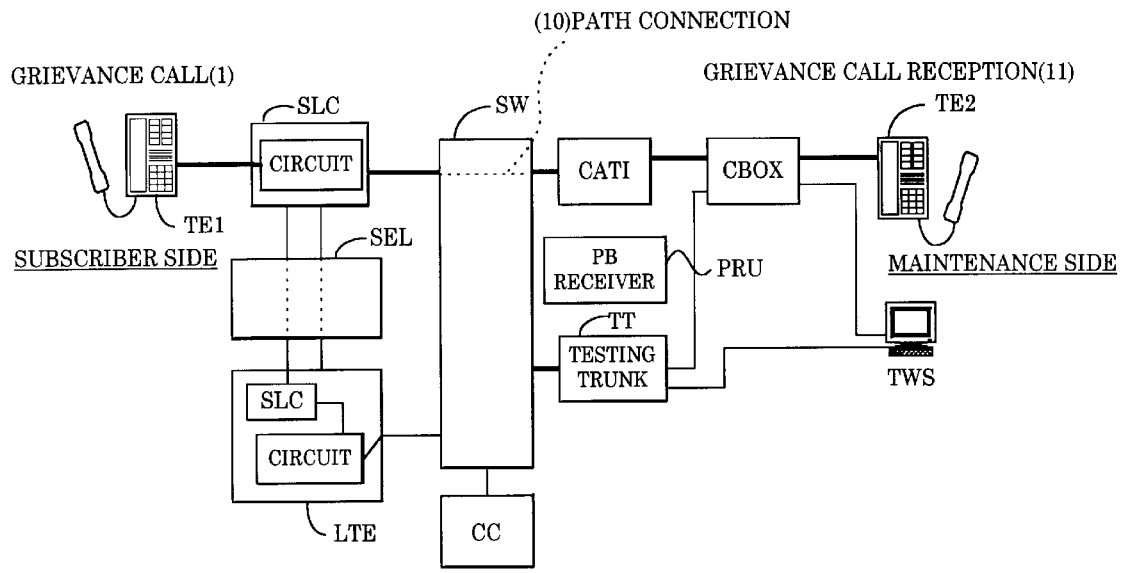
FIG. 18 is a block diagram illustrating an operation (5) of the prior art grievance call processing system.
Figure 19:
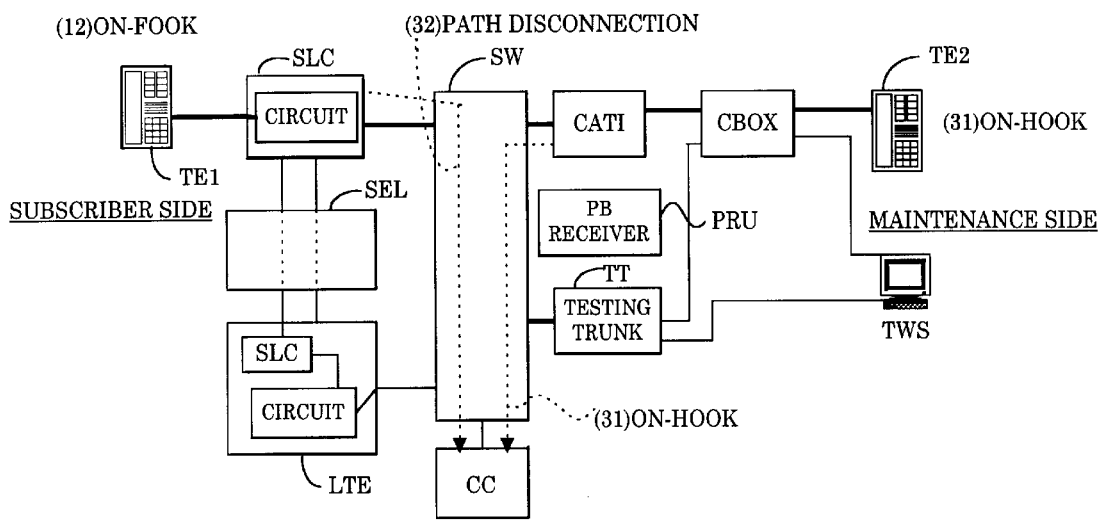
FIG. 19 is a block diagram illustrating an operation (6) of the prior art grievance call processing system.
Figure 20:
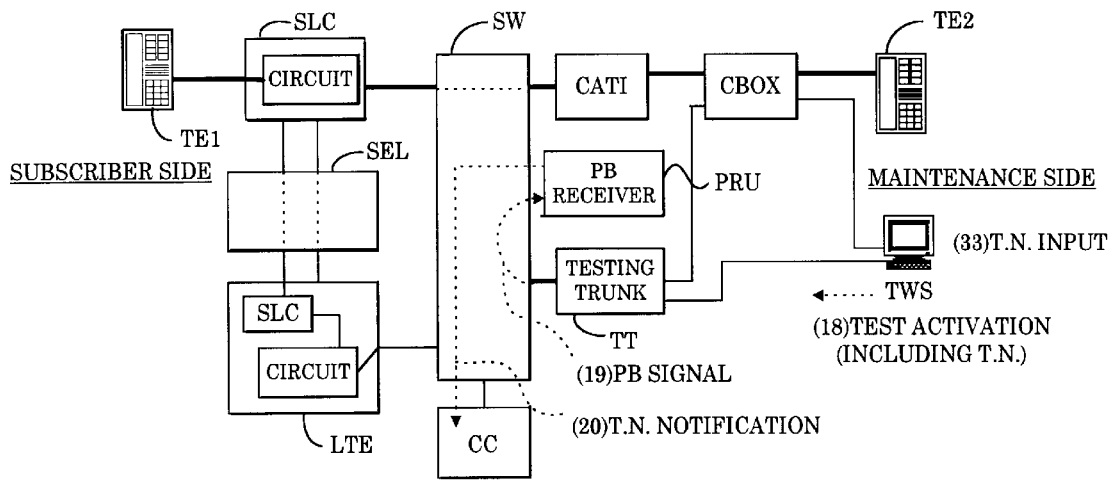
FIG. 20 is a block diagram illustrating an operation (7) of the prior art grievance call processing system.

In operation of FIG. 5, the above-mentioned operation in FIG. 18 is applied for the omission of the descriptions.

Figure 6:
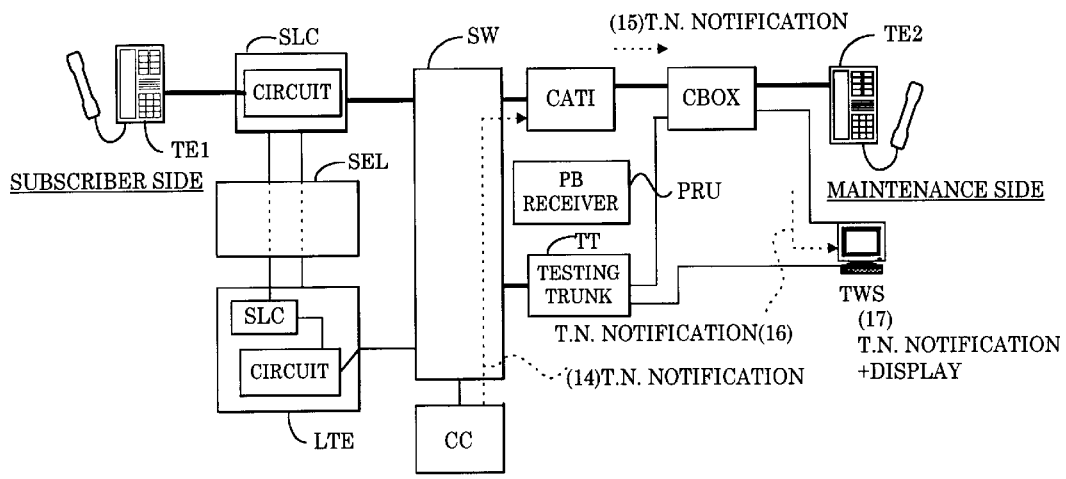
FIG. 6 is a block diagram illustrating an operation (6) of a grievance call processor system according to the present invention.

In operation of FIG. 6, after the conversational condition is set up for the grievance call reception (11) between the subscriber and the maintenance person in the same manner as the abovementioned prior art, the central processing unit CC transmits a notification (14) of the subscriber's T.N. which has been already stored therein to the trunk CATI exclusively used for the reception of the grievance call. It is to be noted that the subscriber's T.N. is already held in a software of the central processing unit CC upon the signal arrival or the reception of the dial notification (2), according to the operation in FIG. 1.

This T.N. notification (14) is further transferred to the line switch unit CBOX from the trunk CATI as a T.N. notification (15) (see FIG. 10), which is then transferred to the workstation TWS from the line switch unit CBOX as a T.N. notification (16) (see FIG. 10).

In the workstation TWS, the subscriber's T.N. included in the T.N. notification (16) is stored as an internal data (17), and is displayed on the CRT screen as shown by a T.N. less than 20 figures in the example of FIG. 10.

Figure 11:
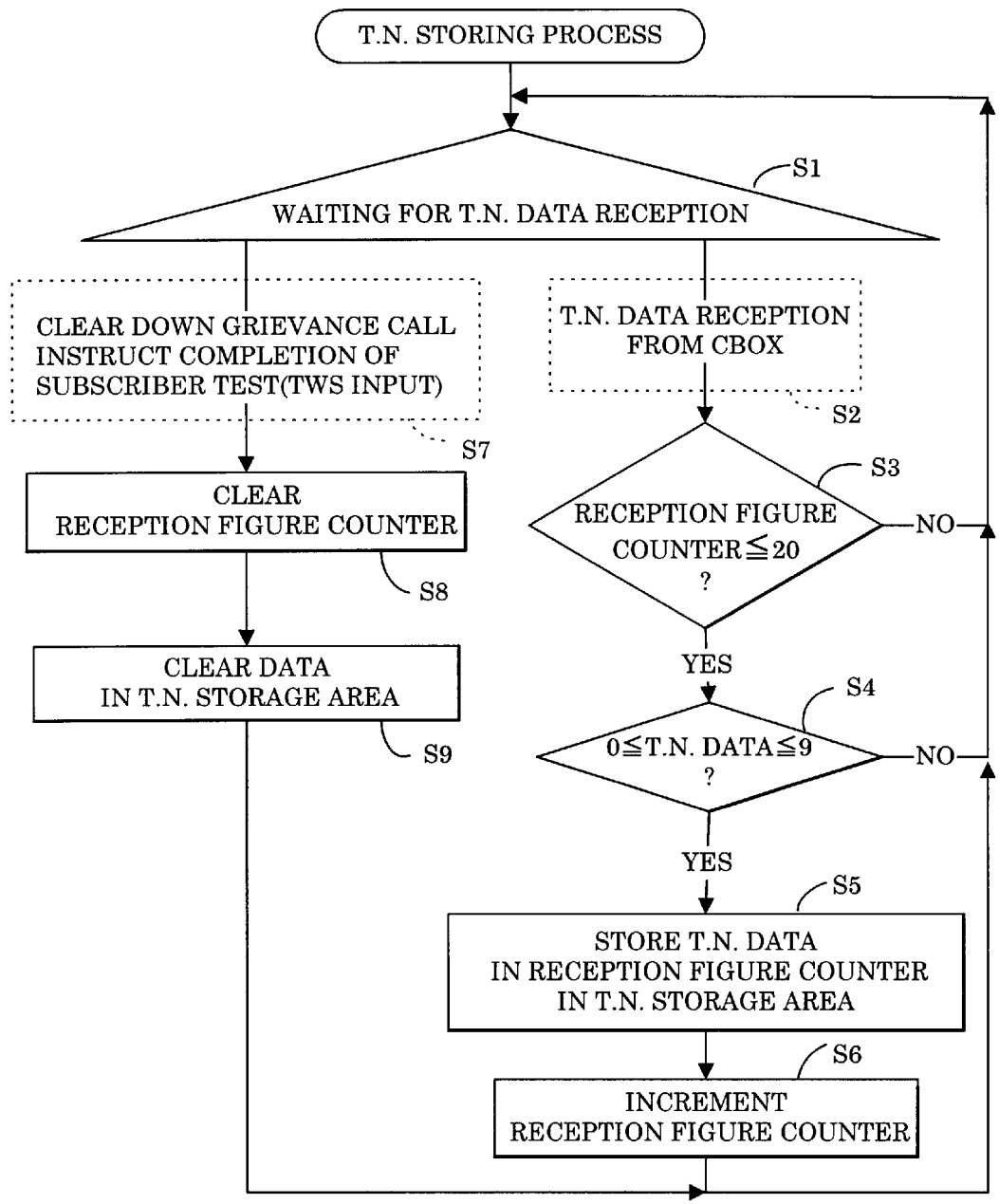
FIG. 11 is a flow chart illustrating a T.N. storing process in a workstation used in a grievance call processing system according to the present invention.

Now, the procedure for storing the subscriber's T.N. in the workstation will be described referring to FIGS. 11 and 12.

The workstation TWS is waiting for the T.N. data (information) in the T.N. notification (16) at step S1. Upon reception of the T.N. data at step S2, whether or not the received figure number is within a fixed value is determined. Namely, on the basis of the count in the reception figure counter shown in FIG. 12A, whether or not the count is equal to or a less than 20 is checked at step S3 in order to determine whether or not the count has a figure number which can be entered into 20 areas at maximum included in the T.N. storage area shown in FIG. 12B.

As a result, if it is found that the count is less than "20" and has a normal figure T.N., then whether or not the T.N. data lies between 0–9 is determined at step S4 to decide whether or not the T.N. data is a normal dial number.

Figures 12A, 12B:
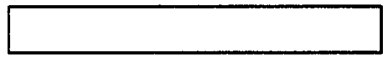
FIG. 12A and 12B are diagrams illustrating a reception figure counter and a T.N. storage area used in a greivance call processing system according to the present invention.

As a result, if it is found that the T.N. data is normal, the T.N. data is stored at the reception figure number in the storage area in FIG. 12B at step S5, and the reception figure counter shown in FIG. 12A is incremented by "1" at step S6.

It is to be noted that in the data waiting state at step S1, a clearing instruction for the grievance call or a finish instruction for the subscriber test is input from the workstation TWS at step S7, the reception figure counter is cleared at step S8, and the data in the T.N. storage area is cleared at step S9.

Figure 7:
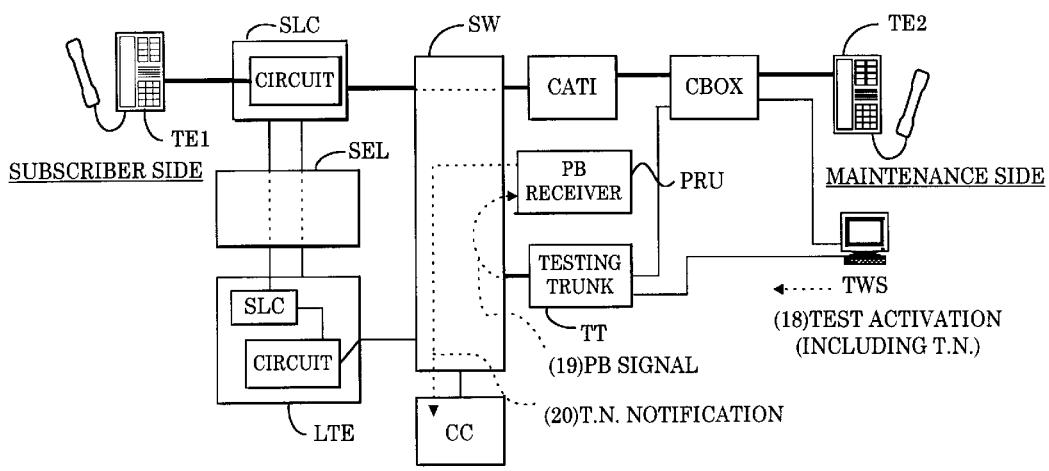
FIG. 7 is a block diagram illustrating an operation (7) of a grievance call processor system according to the present invention.

In operation of FIG. 7, when the subscriber's T.N. is displayed on the screen of the workstation TWS, the maintenance person is to demand a test activation (18) (see FIG. 10) from the workstation TWS. This can be done only by depressing "enter" key in the keyboard of the workstation because the workstation TWS holds therein the subscriber's T.N. data according to the grievance call as described above so that the subscriber's T.N. may be included in the demand of the test activation (18).

Figure 13:
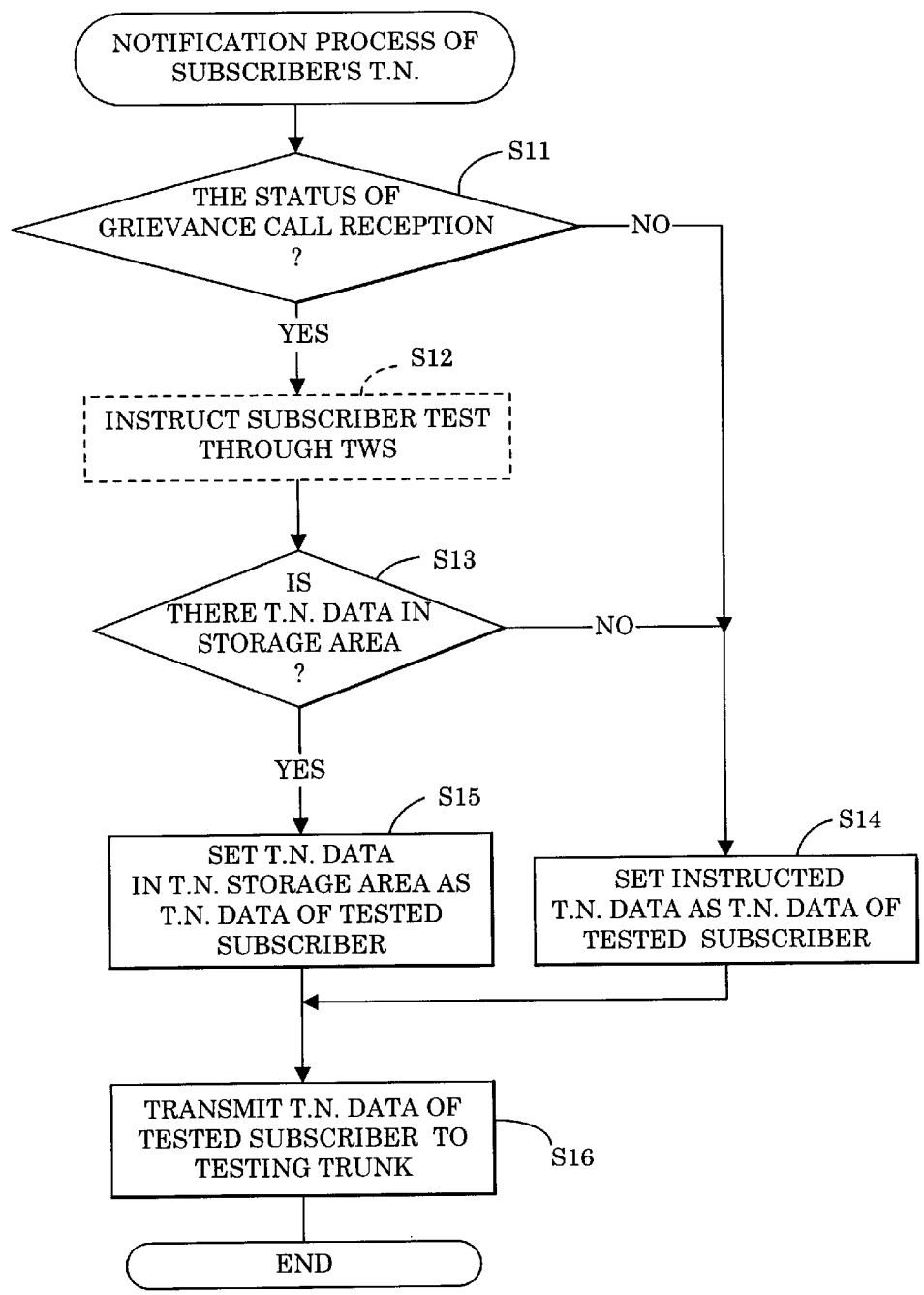
FIG. 13 is a flow chart illustrating a T.N. notification process for subscriber to be tested by a subscriber's test instruction in a grievance call processing system according to the present invention.

The procedure of this test activation (18) from the workstation TWS will be described referring to FIG. 13.

The workstation TWS which has received the T.N. notification (16) shown in FIG. 6 determines at steps S11, S13 whether or not the present state is the grievance call reception state on the basis of whether or not the subscriber's T.N. of the grievance call is included in the T.N. notification (16).

If it is found that the subscriber's T.N. of the grievance call is included in the T.N. notification (16) and the present state is the grievance call reception state, the maintenance person enters the subscriber test instruction at step S12. At this time, the T.N. data in the T.N. storage area is set as the T.N. data for the subscriber to be tested at step S15 to demand the test activation (18) to the testing trunk TT at step S16.

If it is found at the above steps S11, S13 that there is no T.N. data in the T.N. storage area, the maintenance person manually inputs the T.N. data from the workstation in the same manner as the above-mentioned prior art and sets the T.N. data in the one for the subscriber to be tested at step S14 for the transmission to the testing trunk TT at step S16.

Figure 8:
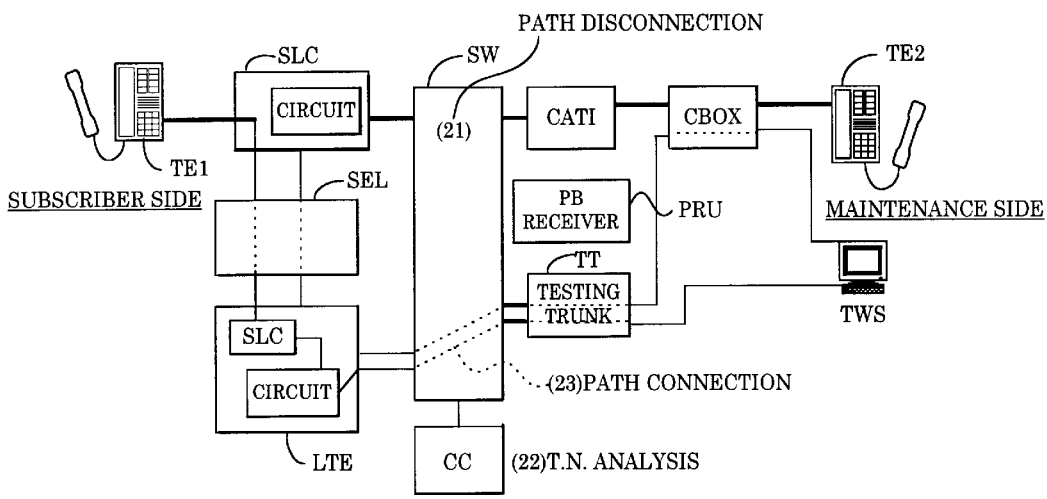
FIG. 8 is a block diagram illustrating an operation (8) of a grievance call processor system according to the present invention.
Figure 21:
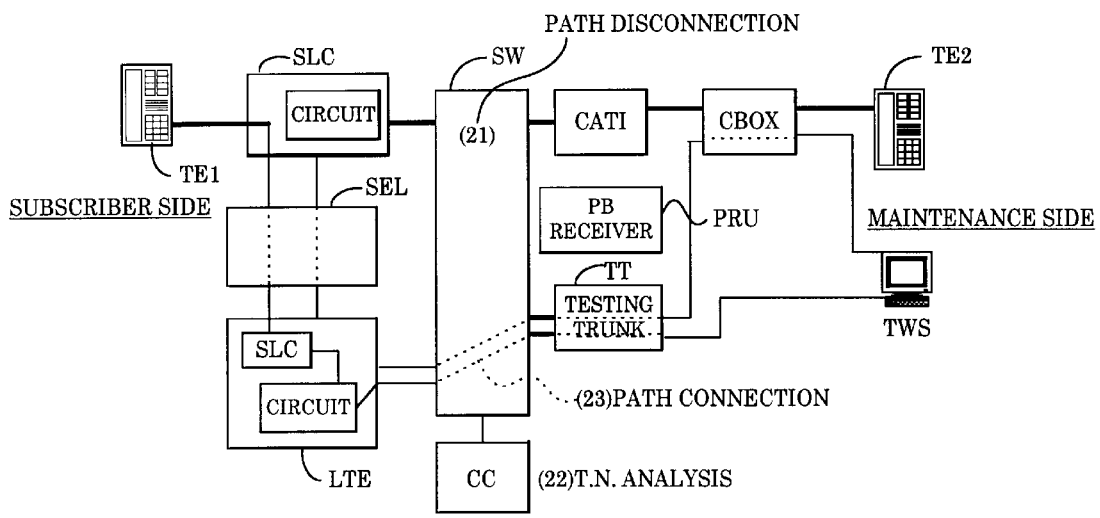
FIG. 21 is a block diagram illustrating an operation (8) of the prior art grievance call processing system.

In operation of FIG. 8, the central processing unit CC performs a path disconnection (21) for the grievance call which has been connected so far and a T.N. analysis (22) to make a path connection (23) between the testing trunk TT and the subscriber testing equipment LTE in the same manner as the operation shown in FIG. 21.

Figure 9:
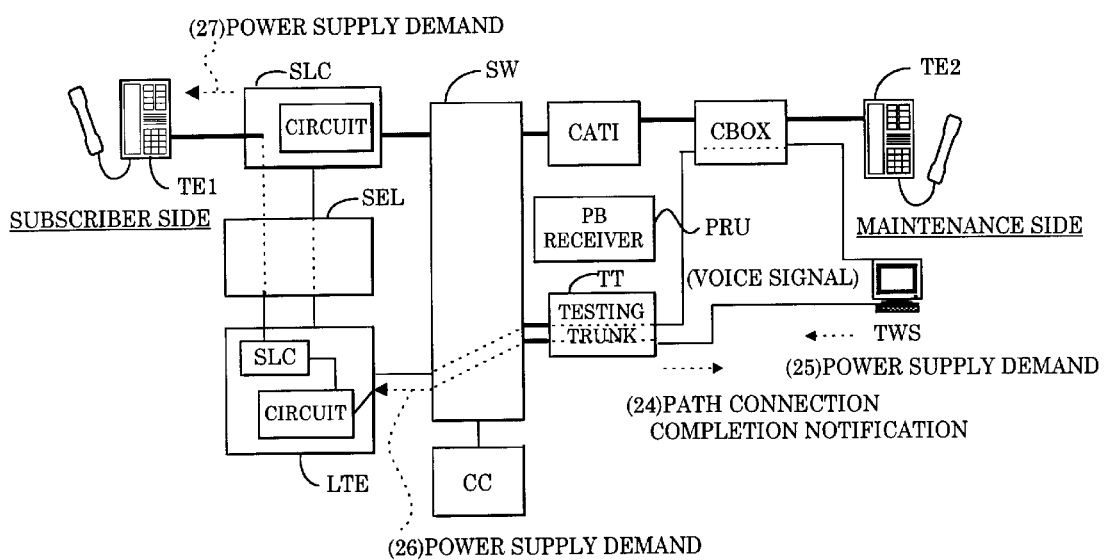
FIG. 9 is a block diagram illustrating an operation (9) of a grievance call processor system according to the present invention.
Figure 22:
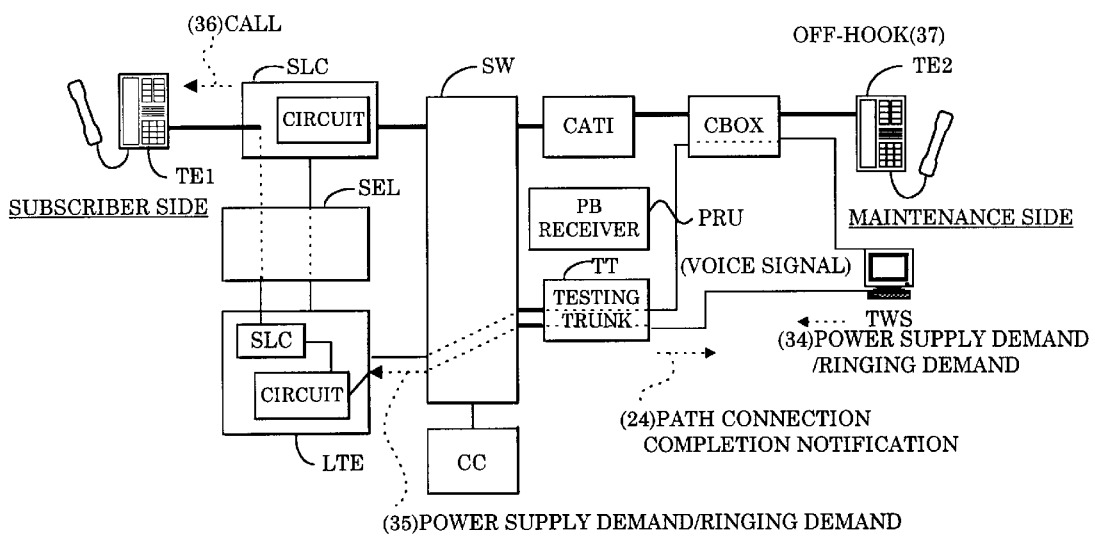
FIG. 22 is a block diagram illustrating an operation (9) of the prior art grievance call processing system.

In operation of FIG. 9, a different point from the operation in FIG. 22 is that no ringing demand is provided from the workstation TWS but only a power supply demand (25) is transmitted to the subscriber testing equipment LTE as a power supply demand (26) through the testing trunk TT and the switch unit SW.

The subscriber testing equipment LTE then outputs a power supply demand (27) to the subscriber through the selector SEL and the subscriber circuit SLC.

Subsequently, a testing conversation between the subscriber and the maintenance person is made possible through the testing trunk TT and the line switch unit CBOX, enabling the test condition to be prepared.

As described above, it is arranged in a grievance call processing system according to the present invention that an electronic switchboard notifies the T.N. information of a subscriber to a workstation, which stores and displays the T.N. information, and when a maintenance person makes a test activation from the workstation upon reception of a grievance call the T.N. information is simultaneously and automatically notified to a testing trunk, which provides the T.N. information to the electronic switchboard, which then sets up a testing path from the workstation to a subscriber testing equipment through the testing trunk for the preparation of a subscriber testing state, so that the maintenance person only has to instruct the subscriber test from the workstation for shifting the grievance call reception state to the subscriber test state, resulting in an extremely simple operability.

Furthermore, time can be reduced up to the subscriber test state and also a waiting time of the subscriber who has made the grievance call can be reduced for the satisfaction of customer's demand.

What we claim is:

1. A grievance call processing system comprising:

an electronic switchboard for providing telephone number information included in a subscriber's grievance call to a maintenance person, a testing trunk and a subscriber testing equipment each connected to the electronic switchboard, and a workstation provided for the maintenance person, in response to the subscriber's grievance call, the electronic switchboard notifying the telephone number information of the subscriber's grievance call to the workstation, which recognizes and displays the telephone number information of the subscriber's grievance call, and when the maintenance person makes a test activation from the workstation with an off-hook state being maintained after reception of the grievance call, the telephone number information of the subscriber being simultaneously and automatically notified to the testing trunk, which then provides the telephone number information to the electronic switchboard, which disconnects a path of the grievance call to set up a testing path connecting the workstation, the testing trunk, the subscriber testing equipment, and the subscriber for the preparation of a subscriber testing state, with the off-hook state being maintained between the subscriber and the maintenance person.

2. A grievance call processing system as claimed in claim 1, wherein the electronic switchboard is composed of a switch unit and a central processing unit for controlling the switch unit, and the central processing unit holds therein the telephone number information of the subscriber.

3. A grievance call processing system as claimed in claim 1, further comprising a trunk, exclusively used for receiving the grievance call, which connects the electronic switchboard and the maintenance person, and a line switch unit for maintenance.

4. A grievance call processing system as claimed in claim 1, wherein when the testing trunk receives the telephone number information a pushbutton receiver analyzes the telephone number information to notify the telephone number to the electronic switchboard.

5. A grievance call processing system as claimed in claim 3, wherein when the testing trunk receives the telephone number information a pushbutton receiver analyzes the telephone number information to notify the telephone number to the electronic switchboard.

6. A grievance call processing system as claimed in claim 4, wherein the electronic switchboard transmits the telephone number notification to the workstation upon detecting an off-hook operation by the subscriber.

7. A grievance call processing system as claimed in claim 5, wherein the electronic switchboard transmits the telephone number notification to the workstation upon detecting an off-hook operation by the subscriber.

8. A grievance call processing system as claimed in claim 1, wherein when the testing path is set up, the workstation transmits a power supply demand to the subscriber.

9. A grievance call processing system as claimed in claim 3, wherein when the testing path is set up, the workstation transmits a power supply demand to the subscriber.

10. A grievance call processing system as claimed in claim 5, wherein when the testing path is set up, the workstation transmits a power supply demand to the subscriber.

11. A grievance call processing system as claimed in claim 7, wherein when the testing path is set up, the workstation transmits a power supply demand to the subscriber.

* * * * *